United States Patent
Ye et al.

(10) Patent No.: US 10,043,365 B2
(45) Date of Patent: Aug. 7, 2018

(54) POSITION INFORMATION PROMPTING METHOD, DEVICE AND SYSTEM

(71) Applicant: BEIJING QIHOO TECHNOLOGY COMPANY LIMITED, Beijing (CN)

(72) Inventors: Yanfang Ye, Beijing (CN); Chao Gao, Beijing (CN); Nancheng Liu, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 32 days.

(21) Appl. No.: 15/031,350

(22) PCT Filed: Oct. 24, 2014

(86) PCT No.: PCT/CN2014/089485
§ 371 (c)(1),
(2) Date: Apr. 22, 2016

(87) PCT Pub. No.: WO2015/058720
PCT Pub. Date: Apr. 30, 2015

(65) Prior Publication Data
US 2016/0240063 A1    Aug. 18, 2016

(30) Foreign Application Priority Data

Oct. 25, 2013 (CN) .......................... 2013 1 0512991
Oct. 25, 2013 (CN) .......................... 2013 1 0513595
Oct. 25, 2013 (CN) .......................... 2013 1 0514183

(51) Int. Cl.
G08B 21/02      (2006.01)
H04W 64/00    (2009.01)
(Continued)

(52) U.S. Cl.
CPC ......... G08B 21/0269 (2013.01); G08B 5/226 (2013.01); G08B 21/0233 (2013.01);
(Continued)

(58) Field of Classification Search
CPC ................ G08B 21/0269; G08B 5/226; G08B 21/0233; G08B 21/0272; G08B 21/0261; G08B 21/0283; G08B 13/19682
See application file for complete search history.

(56) References Cited

U.S. PATENT DOCUMENTS

2006/0178107 A1    8/2006  Taniguchi
2010/0267361 A1   10/2010  Sullivan
(Continued)

FOREIGN PATENT DOCUMENTS

CN    1731892 A      2/2006
CN  101001453 A      7/2007
(Continued)

OTHER PUBLICATIONS

International Search Report of the International Searching Authority for Application No. PCT/CN2014/089485, dated Feb. 3, 2015.

*Primary Examiner* — Kabir A Timory
(74) *Attorney, Agent, or Firm* — Alston & Bird LLP

(57) ABSTRACT

The present invention discloses a position information prompting method, device, and system. A designated server receives from a portable locator multiple position point information obtained according to pre-set time and positioning time corresponding to each position point information, generates a movement track of the portable locator, and records the movement track; then, when the designated server receives the current position point information transmitted by the portable locator, according to the current position point information, an alert signal is generated if the current position point corresponding to the current position point information is not on the recorded movement track. A guardian holding a monitoring terminal can be ensured to know at any time whether the person being monitored and holding the portable locator is on a strange road, and thereby (Continued)

the safety information of the monitored person is mastered, and the user experience is enhanced.

13 Claims, 9 Drawing Sheets

(51) Int. Cl.
*G08B 5/22* (2006.01)
*G08B 21/24* (2006.01)
*H04L 29/08* (2006.01)
*H04W 4/021* (2018.01)
*H04W 4/14* (2009.01)
*H04W 12/06* (2009.01)
*H04W 4/029* (2018.01)

(52) U.S. Cl.
CPC ......... *G08B 21/0272* (2013.01); *G08B 21/24* (2013.01); *H04L 67/02* (2013.01); *H04W 4/021* (2013.01); *H04W 4/029* (2018.02); *H04W 4/14* (2013.01); *H04W 12/06* (2013.01); *H04W 64/006* (2013.01)

(56) References Cited

U.S. PATENT DOCUMENTS

| | | | | |
|---|---|---|---|---|
| 2010/0325194 | A1* | 12/2010 | Williamson | H04W 4/02 709/203 |
| 2014/0162693 | A1* | 6/2014 | Wachter | H04W 4/04 455/456.3 |

FOREIGN PATENT DOCUMENTS

| | | |
|---|---|---|
| CN | 101221685 A | 7/2008 |
| CN | 101390136 A | 3/2009 |
| CN | 101409919 A | 4/2009 |
| CN | 101604014 A | 12/2009 |
| CN | 201365346 Y | 12/2009 |
| CN | 101854585 A | 10/2010 |
| CN | 201682621 U | 12/2010 |
| CN | 102103786 A | 6/2011 |
| CN | 102223601 A | 10/2011 |
| CN | 102279405 A | 12/2011 |
| CN | 103037506 A | 4/2013 |
| CN | 103561069 A | 2/2014 |
| CN | 103561073 A | 2/2014 |
| CN | 103561464 A | 2/2014 |
| WO | WO 2013/001421 A1 | 1/2013 |

* cited by examiner

POSITION INFORMATION PROMPTING METHOD, DEVICE AND SYSTEM

FIELD OF THE INVENTION

The present invention relates to the technical field of electronic communications, and particularly to a position information prompting method, device and system.

BACKGROUND OF THE INVENTION

Children missing events that happened in the long past have drawn social concerns. When a child and his guardian wander away from each other, in the prior art, for example the child may send a short message to or have a voice call with the guardian by dialing the guardian's phone to tell the guardian his current position information. However, it is very difficult for the child to clearly describe the current position information as not being familiar with the ambient surrounding; furthermore, assume the child is confronted with a wicked abductor due to insufficient security awareness, he can hardly find his guardian. The guardian can only resort to news media or government authority to seek for the child, but the seeking effectiveness is undesirable.

Hence, it is urgently desirable to provide a method to ensure that the guardian can know the child's position information at any time.

SUMMARY OF THE INVENTION

In view of the above problem, the present invention provides a position information prompting method, device and system which can overcome or at least partially solve or ease the above problem, to ensure that the guardian can know the child's position information at any time and improve missing person-seeking effectiveness.

According to an aspect of the present invention, there is provided a position information displaying method, comprising:

a server receiving and recording position point information transmitted regularly by a portable locator, the position point information comprising information for positioning a position point of the portable locator;

determining a location area corresponding to the position point information according to the position point information;

making statistics of the number of position points corresponding to the position point information in the location area among recorded position point information;

marking the location area or position points in the location area if the number of the position points exceeds a threshold;

displaying the marked location area or position points in the location area in an electronic map.

The present invention further provides a position information display device, comprising:

a receiving module configured to receive and record position point information transmitted regularly by a portable locator, the position point information comprising information for positioning a position point of the portable locator;

a determining module configured to determine a location area corresponding to the position point information according to the position point information;

a statistics module configured to make statistics of the number of position points corresponding to the position point information in the location area among recorded position point information;

a marking module configured to mark the location area or position points in the location area if the number of the position points exceeds a threshold;

a displaying module configured to display the marked location area or position points in the location area in an electronic map.

The present invention further provides a position information displaying system, comprising: a server, a monitoring terminal and a portable locator;

The server comprises the above-mentioned position information displaying device;

The monitoring terminal is configured to transmit to the server an activation request which comprises an identifier of the portable locator, make the server activates the portable locator corresponding to the identifier of the portable locator, and reports to the portable locator a time interval or a reporting time of reporting the position point information, make the portable locator regularly transmits the position point information of the portable locator to the server according to the time interval or reporting time;

The portable locator is configured to receive the time interval or the reporting time of reporting the position point information transmitted by the server, and regularly transmit the position point information of the portable locator to the server according to the time interval or reporting time; or preset the time interval or the reporting time of reporting the position point information, and regularly transmit the position point information of the portable locator to the server according to the time interval or reporting time.

According to another aspect of the present invention, there is provided a position information prompting method, comprising:

a designated server receiving from a portable locator multiple position point information obtained according to pre-set time and positioning time corresponding to each position point information, the position point information comprising information for positioning the position point of the current portable locator in an electronic map;

generating a movement track of the portable locator according to multiple position point information and positioning time corresponding to each position point information, and recording the movement track;

receiving the current position point information transmitted by the portable locator;

according to the current position point information, generating an alert signal if the current position point corresponding to the current position point information is not on the recorded movement track.

The present invention further provides a position information prompting device located on a designated server side, comprising:

a receiving module configured to receive from a portable locator multiple position point information obtained according to pre-set time and positioning time corresponding to each position point information, the position point information comprising information for positioning the position point of the current portable locator in an electronic map;

a recording module configured to generate a movement track of the portable locator according to multiple position point information and positioning time corresponding to each position point information, and record the movement track;

the receiving module is further configured to receive the current position point information transmitted by the portable locator;

an alert information generating module configured to, according to the current position point information, generate an alert signal if the current position point corresponding to the current position point information is not on the recorded movement track.

The present invention further provides a position information prompting system, comprising a designated server, a monitoring terminal and a portable locator;

The portable locator is configured to transmit multiple position point information and positioning time corresponding to each position point information to the designated server;

The designated server is configured to receive from the portable locator multiple position point information obtained according to pre-set time and positioning time corresponding to each position point information, the position point information comprising information for positioning the position point of the current portable locator in an electronic map, generate a movement track of the portable locator, and record the movement track;

the portable locator is further configured to transmit the current position point information to the designated server;

the designated server is further configured to receive the current position point information transmitted by the portable locator; and according to the current position point information, generate an alert signal if the current position point corresponding to the current position point information is not on the recorded movement track.

According a further aspect of the present invention, there is provided a position information prompting method, comprising a designated server receiving and recording position point information transmitted by a portable locator, the position point information comprising information for positioning a position point of the portable locator;

generating a movement track and/or stay area according to recorded position point information and positioning time corresponding to each position point information, and recording the movement track and/or stay area;

when receiving the current position point information transmitted by the portable locator, the designated server judging whether the position point corresponding to the current position point information is in the recorded track and/or stay area, and generating an early warning signal if the position point corresponding to the current position point information is not in the recorded track and/or stay area;

judging whether the number of continuously-generated early warning signals exceeds a threshold, generating an alert signal if the number exceeds the threshold, and notifying a user associated with the portable locator of the alert signal.

The present invention further provides a position information prompting device located on a designated server side, comprising:

a receiving module configured to receive and record multiple position point information transmitted by the portable locator, the position point information comprising information for positioning a position point of the portable locator;

a track generating module configured to generate a movement track and/or stay area according to recorded position point information and positioning time corresponding to each position point information, and record the movement track and/or stay area;

a judging module configured to, when the receiving module receives the current position point information transmitted by the portable locator, judge whether the position point corresponding to the current position point information is in the recorded track and/or stay area;

an early warning module configured to generate an early warning signal when the judging module judges the position point corresponding to the current position point information is not in the recorded track and/or stay area;

an alert module configured to generate an alert signal when the judging module judges that the number of continuously-generated early warning signals exceeds a threshold, and notify a user associated with the portable locator of the alert signal.

The present invention further provides a position information prompting system, comprising: a designated server, a portable locator and a monitoring terminal;

The designated server comprises the position information prompting device according to the second aspect of the invention;

The monitoring terminal is configured to send an activation request to the designated server, the activation request comprising an identifier of the portable locator, make the designated server verifies the monitoring terminal and authorizes the monitoring terminal to have a monitoring right to the portable locator, and activates the portable locator;

The portable locator is configured to transmit position point information of the portable locator to the designated server after activation.

According to another aspect of the present invention, there is provided a computer program which comprises a computer readable code; when the computer readable code is run on a computing device, the computing device executes the aforesaid position information prompting method.

According to a further aspect of the present invention, there is provided a computer readable medium which stores the above-mentioned computer program.

Advantageous effects of the present invention are as follows:

According to an aspect of the present invention, the server receives and records position point information regularly transmitted by the portable locator, the position point information comprising information for positioning the position point where the portable locator lies; the location area corresponding to the position point information is determined according to the position point information; statistics is performed for the number of position points corresponding to the position point information in the location area among recorded position point information; the location area or position points in the location area are marked if the number of position points exceeds the threshold; the marked location area or position points in the location area are displayed in the electronic map; a guardian holding the monitoring terminal can be ensured to know the position and stay time at the position of the person being monitored and holding the portable locator through the mark displayed in the electronic map, thus user experience is enhanced.

According to another aspect of the present invention, the designated server generates a movement track of the portable locator in the preset time period according to multiple position point information and positioning time corresponding to each position point information transmitted by the portable locator, and records the movement track; then, when the designated server receives the current position point information transmitted by the portable locator, according to the current position point information, an alert signal is generated if the current position point corresponding to the current position point information is not on the recorded movement track. A guardian holding the monitoring terminal can be ensured to know at any time whether the person being monitored and holding the portable locator is on a strange road, and thereby the safety information of the monitored person is mastered, and user experience and subsequent missing person-seeking effectiveness are enhanced.

According to a further aspect of the present invention, the designated server receives and records the position point information transmitted by the portable locator, generates a movement track and/or stay area according to the recorded position point information and positioning time corresponding to each position point information, and records the movement track and/or stay area; when the current position point information transmitted by the portable locator is received, a judgment is performed as to whether the position point corresponding to the current position point information is in the recorded track and/or stay area, and an early warning signal is generated if the position point is not in the recorded track and/or stay area; another judgment is performed as to whether the number of continuously-generated early warning signals exceeds a threshold, and an alert signal is generated if the number exceeds the threshold, and a user associated with the portable locator is notified of the alert signal. A guardian holding the monitoring terminal can be ensured to know whether the person being monitored and holding the portable locator is in a strange reminder area through the mark displayed in the electronic map, thus the safe position information of the monitored person is mastered, and user experience and subsequent missing person-seeking effectiveness are enhanced.

The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments and not construed as limiting the present invention. In all figures, the same reference numbers denote the same part. In the figures.

DETAILED DESCRIPTION OF THE INVENTION

Technical solutions in embodiments of the present invention will be clearly and completely described with reference to figures in the embodiments of the present invention to make objects, technical solutions and advantages of embodiments of the present invention more apparent. Obviously, the described embodiments are only partial embodiments of the present invention, not all embodiments. All other embodiments obtained by those having ordinary skill in the art based on embodiments in the present invention fall within the protection scope of the present invention.

Noticeably, a monitoring terminal mentioned in embodiments of the present invention for example includes a mobile monitoring terminal (handset) held by a guardian.

A portable locator includes a bracelet-like portable locator worn on a wrist of a person under guardianship; the portable locator for example has a positioning function of a Global Positioning System (GPS), again for example further has a communication function of a General Packet Radio Service (GPRS) technology; again for example further has a communication function of Global System of Mobile communication (GSM); again for example further has a communication function of Bluetooth and/or Bluetooth Low Energy (BLE); again for example further has a communication function of Enhanced Data Rate for GSM Evolution (EDGE); again for example further has a communication function of Code Division Multiple Access (CDMA); again for example further has a communication function of Wide band Code Division Multiple Access (WCDMA); again for example further has a communication function of Time Division-Synchronous Code Division Multiple Access (TD-SCDMA); again for example further has a communication function of Time Division Long Term Evolution (TD-LTE); and again for example further has a communication function of Long Term Evolution (LTE);

A server for example includes a server arrange in equipment such as a base station or a macro eNodeB.

Figure 1:
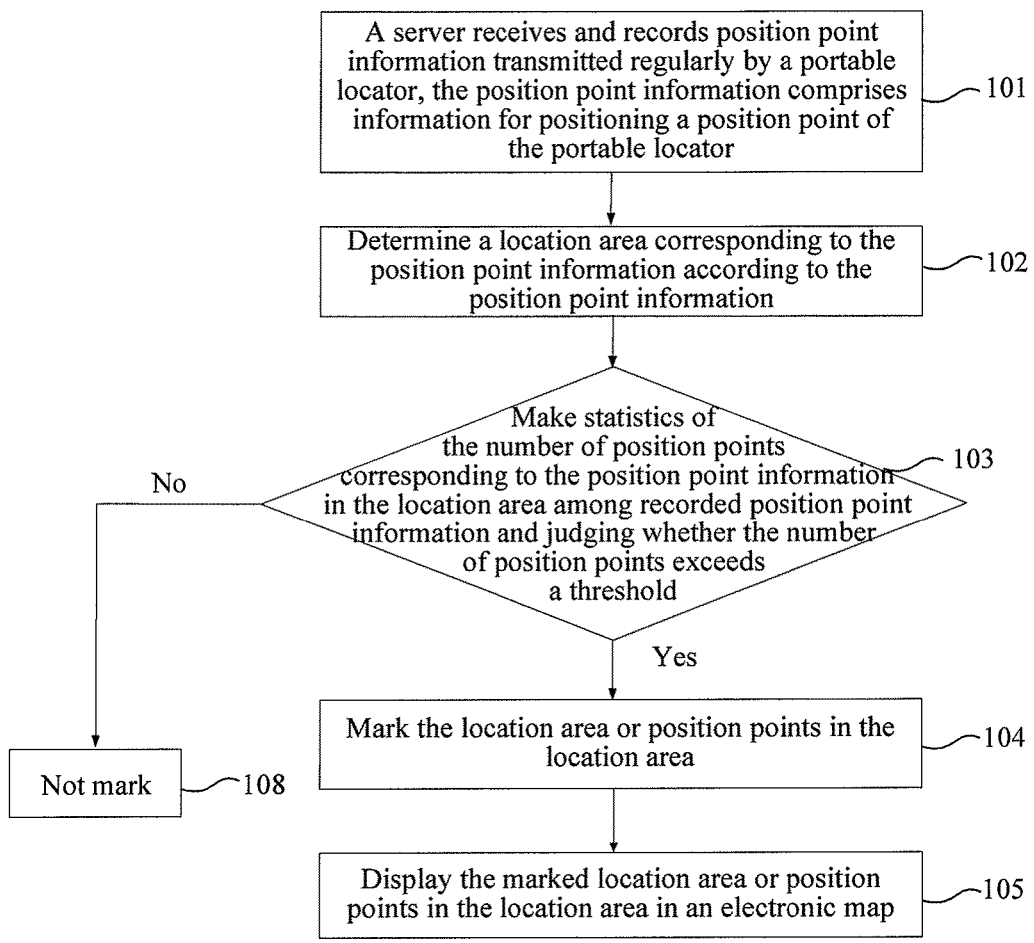
FIG. 1 is a flow chart of a position information displaying method according to an embodiment of the present invention.

FIG. 1 is a flow chart of a position information displaying method according to an embodiment of the present invention. As shown in FIG. 1, the position information displaying method according to the present embodiment may comprise:

101: A server receives and records position point information transmitted regularly by the portable locator, wherein the position point information comprises information for positioning a position point of the portable locator;

In an optional embodiment of the present invention, prior to step 101, the method comprises:

The monitoring terminal sends an activation request to the server, wherein the activation request comprises an identifier of the portable locator; wherein the identifier of the portable locator for example comprises a QR code of the portable locator or a card number of a Subscriber Identity Module (SIM) set in the portable locator;

The server performs authorization and verification for the monitoring terminal according to the identifier of the portable locator, makes the monitoring terminal can focus on the portable locator, and activates the portable locator corresponding to the identifier, makes the activated portable locator can transmit position point information of the portable locator to the server.

Furthermore, the monitoring terminal can transmit to the activated portable locator via the server a time interval or a reporting time of reporting the position point information, make the portable locator regularly transmits the position point information of the portable locator to the server according to the time interval or reporting time; or The server transmits to the portable locator a time interval or a reporting time of reporting the position point information, makes the portable locator regularly transmits the position point information of the portable locator to the server according to the time interval or reporting time; or The portable locator presets a time interval or a reporting time of reporting the position point information, and regularly transmits the position point information of the portable locator to the server according to the above time interval or reporting time.

102: determining a location area corresponding to the position point information according to the position point information;

In an optional embodiment of the present invention, step 102, upon specific implementation, comprises:

according to the position point information, considering a natural geographical area where a position point corresponding to the position point information locates as the location area corresponding to the position point information; for example, assume when the natural geographical area is a school, a boundary of the school is a boundary of the natural geographical area, all the position points occur in the school belong to the natural geographical area of the school; or taking the position point corresponding to the position point information as a center, considering a surrounding area of a preset radius as the location area corresponding to the position point information; for example, taking the position point reported by the locator as a center, considering an area within a surrounding scope of a preset radius (e.g., a radius of 20 meters) as the location area corresponding to the position point; or judging there are multiple neighbor position points around the position point corresponding to the position point information, and determining the location area corresponding to the position point information according to a distance between the position point and the multiple neighbor position points; for example, if there are multiple neighbor position points around the position point as reported by the locator, assume the preset distance of neighborhood is 10 meters, an area formed by the neighbor position points within 10 meters (inclusive) around the position point can be considered as the location area corresponding to the position point.

103: making statistics of the number of position points corresponding to the position point information in the location area among recorded position point information, and judging whether the number of position points exceeds a threshold; executing step 104 if yes, and executing step 108 if no;

Upon specific implementation, statistics is performed for the number of position points corresponding to the position point information in the location area among recorded position point information in a time period as same as a preset time period where a positioning time of the position point information lies; for example, making statistics of multiple position point information recorded by the server and reported by the locator within a preset time period (one day or several hours), respectively determining position points corresponding to the multiple position point information, according to each position point, determining which position points fall within the location area determined in step 102, and making statistics of the number of position points falling within the location area determined in step 102; for example, in a certain location area, presetting two hours to make statistics of the number of position points once, specifically, from the positioning time of the first position point information, a statistic is performed as to whether the number of position points appearing in the location area within two hours exceeds a threshold, and the position points appearing in the location area after two hours can only participate in the next statistic of the number of position points in the location area.

In the present embodiment, the preset threshold can be specifically set according to different location areas. For example, when the monitored person is a child, school and home, these two location areas, are safe location areas, stay in the two location areas is relatively longer, there are relatively more position point information recorded in the two location areas, so the threshold for the number of position points in the two location areas is relatively larger.

104: marking the location area or position points in the location area;

Corresponding to step 103, the marking in step 104 corresponds to the preset time period.

If the number of position points does not exceed the threshold, step 108 will be executed, namely, not marking the location area or position points in the location area.

105: displaying the marked location area or position points in the location area in an electronic map.

Upon specific implementation, step 105 comprises:

displaying the marked location area or position points in the location area differently according to the number of position points corresponding to the recorded position point information contained in the location area; and/or displaying the marked location area or position points in the location area differently according to a time difference between a positioning time of a first recorded position point in the location area and a positioning time of a last recorded position point.

For example, displaying differently as stated above specifically comprises:

displaying in the electronic map the marked location area or position points in the location area with different sizes, colors, brightness and transparency according to the number of the position points and/or a length of the time difference.

Figure 2:
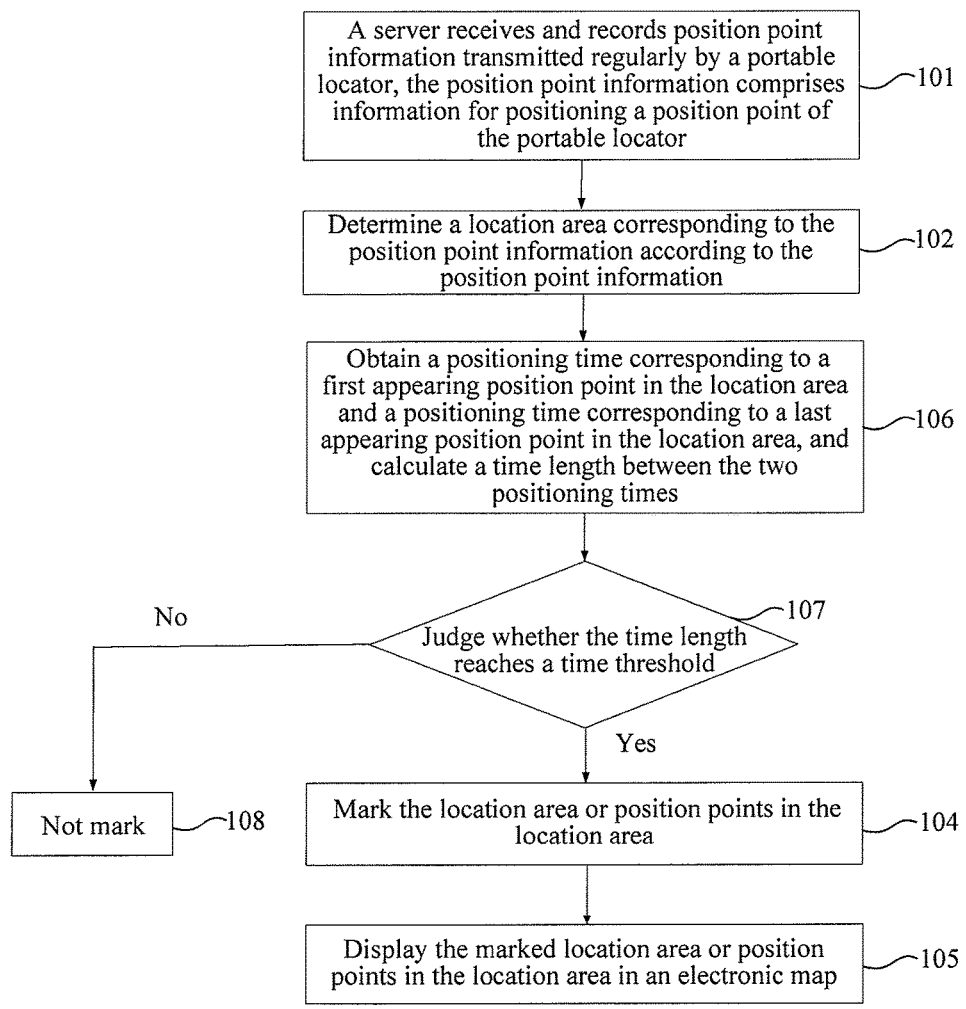
FIG. 2 is a flow chart of a position information displaying method according to another embodiment of the present invention.

FIG. 2 is a flow chart of a position information displaying method according to another embodiment of the present invention. As shown in FIG. 2, in an optional embodiment of the present invention, the method further comprises after step 102:

Step 106: obtaining a positioning time corresponding to a first appearing position point in the location area and a positioning time corresponding to a last appearing position point in the location area, and calculating a time length between the two positioning times.

Step 107: judging whether the time length reaches a time threshold;

In the present embodiment, the preset time threshold can be specifically set according to different location areas. For example, when the monitored person is a child, school and home, these two location areas, are safe location areas, stay in the two location areas is relatively longer, so the time threshold for the stay in the two location areas is relatively larger.

If the time length reaches the time threshold, step 104 and step 105 will be performed, namely, marking the location area or position points in the location area, and displaying the marked location area or position points in the location area in an electronic map.

If the time length does not reach the time threshold, step 108 will be performed, namely, not marking the location area or position points in the location area.

Figure 3:
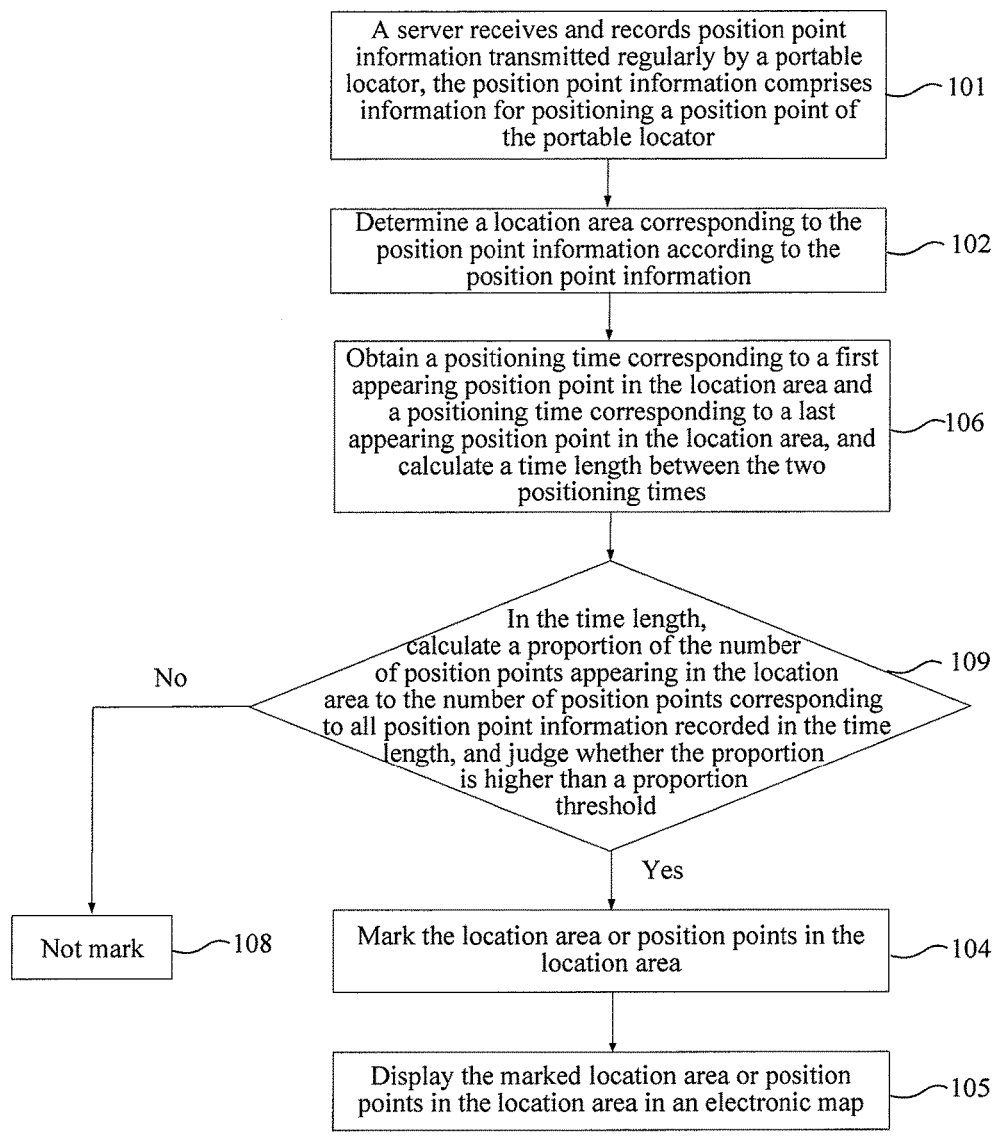
FIG. 3 is a flow chart of a position information displaying method according to another embodiment of the present invention.

FIG. 3 is a flow chart of a position information displaying method according to another embodiment of the present invention. As shown in FIG. 3, in an optional embodiment of the present invention, the method further comprises after step 106:

Step 109: in the time length, calculating a proportion of the number of position points appearing in the location area to the number of position points corresponding to all position point information recorded in the time length, and judging whether the proportion is higher than a proportion threshold;

In the present embodiment, the preset proportion threshold can be specifically set according to different location areas. For example, when the monitored person is a child, school and home, these two location areas, are safe location areas, stay in the two location areas is relatively longer, so the proportion of the number of position points appearing in the two location areas to the number of position points corresponding to all recorded position point information is relatively higher. For example, the home is taken as an example. A time period from 10:00 pm to 10:00 am is a preset statistic time period. Among all position point information recorded in the 12 hours, most position points appear at home due to sleep time at night. After getting up in the morning, the monitored person will leave the location of home for many reasons such as going to school or going shopping. Hence, the proportion of position points occurring in the location area of home is very high, that is to say, the time length of stay in the location area can be determined and thereby whether the location area is a familiar or safe location area be determined according to the number of all position points obtained from statistics in the preset time period, and according to a proportion of the number of position points appearing in a certain location area to the number of all position points.

If the proportion determined in step 109 is higher than the proportion threshold, step 104 and step 105 will be performed, namely, marking the location area or position points in the location area, and displaying the marked location area or position points in the location area in an electronic map.

If the proportion determined in step 109 is lower than the proportion threshold, step 108 will be performed, namely, not marking the location area or position points in the location area.

Noticeably, in the present embodiment, the server can further receive multiple position point information transmitted by the portable locator in a continuous time period; and mark the position point corresponding to each position point information in a temporal order according to the positioning time corresponding to each position point information, and generate a movement track of the portable locator.

Noticeably, it the present embodiment, to simplify the number of displayed identifiers and improve user distinguishing efficiency, when there are multiple position point information in the same geographical location area, only one display identifier can be marked.

In the embodiment of the present invention, the server can receive and record position point information regularly transmitted by the portable locator in a preset time period, the position point information comprising information for positioning the position point where the portable locator lies; determine the location area corresponding to the position point information according to the position point information; make statistics of the number of position points corresponding to the position point information in the location area among recorded position point information; mark the location area or position points in the location area if the number of position points exceeds the threshold; or obtain a positioning time corresponding to a first appearing position point in the location area and a positioning time corresponding to a last appearing position point in the location area, and calculate a time length between the two positioning times; judge whether the time length reaches a time threshold, and mark the location area or position points in the location area if the time length reaches the time threshold; or in the time length, calculate a proportion of the number of position points appearing in the location area to the number of position points corresponding to all position point information recorded in the time length, and mark the location area or position points in the location area if the proportion is higher than a preset value.

Then, the marked location area or position points in the location area are displayed in an electronic map. Specifically, the marked location area or position points in the location area are displayed in the electronic map with different sizes, colors, brightness and transparency according to the number of the position points and/or a length of the time difference. For example, home and school, as two geographic location areas, are location areas with the longest stay time as well as the safest location areas, and can be displayed with a blue mark which can be larger; again for example, grandparents' home is a location area with longer stay as well as a relatively safe area and can be displayed with a yellow mark which can be slightly smaller.

Then, the guardian holding the monitoring terminal determines the position information of the person under guardianship and carrying the portable locator through the mark displayed on the electronic map, and can obtain security information through the position information; the guardian can further determine the track of the person under guardianship and carrying the portable locator according to a movement track of the portable locator.

Hence, the technical solutions of embodiments of the present invention can improve the user experience as well as the subsequent missing person-seeking effectiveness.

Figure 4:
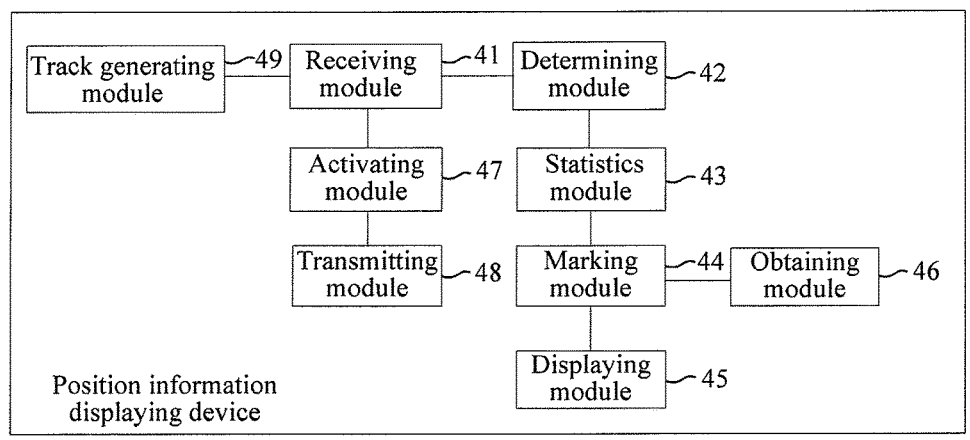
FIG. 4 is a schematic structural diagram of a position information displaying device according to another embodiment of the present invention.

FIG. 4 is a schematic structural diagram of a position information displaying device according to another embodiment of the present invention; on the server side, the device specifically comprises as shown in FIG. 4:

a receiving module 41 configured to receive and record position point information transmitted regularly by the portable locator, wherein the position point information comprises information for positioning a position point of the portable locator;

a determining module 42 configured to determine a location area corresponding to the position point information according to the position point information;

a statistics module 43 configured to make statistics of the number of position points corresponding to the position point information in the location area among recorded position point information;

a marking module 44 configured to mark the location area or position points in the location area if the number of the position points exceeds a threshold;

a displaying module 45 configured to display the marked location area or position points in the location area in an electronic map.

Optionally, the displaying module 45 is specifically configured to:

display the marked location area or position points in the location area differently according to the number of position points corresponding to the recorded position point information contained in the location area; and/or display the marked location area or position points in the location area differently according to a time difference between a positioning time of a first recorded position point in the location area and a positioning time of a last recorded position point.

The displaying module 45 is specifically configured to:

display in the electronic map the marked location area or position points in the location area with different sizes, colors, brightness and transparency according to a magnitude of the number of the position points and/or a length of the time difference.

Optionally, the device further comprises:

an obtaining module 46 configured to obtain a positioning time corresponding to a first appearing position point in the location area and a positioning time corresponding to a last appearing position point in the location area, and calculate a time length between the two positioning times.

The marking module 44 is configured to judge whether the time length calculated by the obtaining module 46 reaches a time threshold, and mark the location area or position points in the location area if the time length reaches the time threshold, and not mark if the time length does not reach the time threshold; or in the time length calculated by the obtaining module, calculate a proportion of the number of position points appearing in the location area to the number of position points corresponding to all position point information recorded in the time period, and mark the location area or position points in the location area if the proportion is higher than a preset proportion threshold, and not mark the location area or position points in the location area if the proportion is lower than a preset proportion threshold.

Optionally, the statistics module 43 is specifically figured to:

make statistics of the number of position points corresponding to the position point information in the location area among position point information recorded in a time period as same as a preset time period where a positioning time of the position point information lies;

the marking corresponds to the preset time period.

Optionally, the determining module 42 is specifically configured to:

according to the position point information, consider a natural geographical area where a position point corresponding to the position point information locates as the location area corresponding to the position point information; or take the position point corresponding to the position point information as a center, consider a surrounding area of a preset radius as the location area corresponding to the position point information; or judge there are multiple neighbor position points around the position point corresponding to the position point information, and determine the location area corresponding to the position point information according to a distance between the position point and the multiple neighbor position points.

Optionally, the receiving module 41 is further configured to receive an activation request transmitted by a monitoring terminal, the activation request comprising an identifier of the portable locator;

An activating module 47 is configured to activate the portable locator corresponding to the identifier of the portable locator according to the identifier of the portable locator comprised in the activation request, make the activated portable locator transmits position point information of the portable locator to the server.

Optionally, the device further comprises:

a transmitting module 48 configured to transmit to the portable locator a time interval or a reporting time of reporting the position point information, make the portable locator regularly transmits the position point information of the portable locator to the server according to the time interval or reporting time; or Noticeably, the time interval or the reporting time of reporting the position point information can be transmitted by the monitoring terminal to the activated portable locator via the server; or the time interval or the reporting time of reporting the position point information is preset by the server; or the portable locator can preset the time interval or the reporting time of reporting the position point information, and regularly transmits the position point information of the portable locator to the server according to the above time interval or reporting time.

Optionally, the receiving module 41 is further configured to receive multiple position point information transmitted by the portable locator in a continuous time period;

a track generating module 49 is configured to mark the position point corresponding to each position point information in a temporal order according to the positioning time corresponding to each position point information, and generate a movement track of the portable locator.

In the embodiment of the present invention, the server can receive and record position point information regularly transmitted by the portable locator in a preset time period, the position point information comprising information for positioning the position point where the portable locator lies; determine the location area corresponding to the position point information according to the position point information; make statistics of the number of position points corresponding to the position point information in the location area among recorded position point information; mark the location area or position points in the location area if the number of position points exceeds the threshold; or obtain a positioning time corresponding to a first appearing position point in the location area and a positioning time corresponding to a last appearing position point in the location area, and calculate a time length between the two positioning times; judge whether the time length reaches a time threshold, and mark the location area or position points in the location area if the time length reaches the time threshold; or in the time length, calculate a proportion of the number of position points appearing in the location area to the number of position points corresponding to all position point information recorded in the time length, and mark the location area or position points in the location area if the proportion is higher than a preset value.

Then, the marked location area or position points in the location area are displayed in an electronic map. Specifically, the marked location area or position points in the location area are displayed in the electronic map with different sizes, colors, brightness and transparency according to a magnitude of the number of the position points and/or a length of the time difference. For example, home and school, as two geographic location areas, are location areas with the longest stay time as well as the safest location areas, and can be displayed with a blue mark which can be larger; again for example, grandparents' home is a location area with longer stay as well as a relatively safe area and can be displayed with a yellow mark which can be slightly smaller.

Then, the guardian holding the monitoring terminal determines the position information of the person under guardianship and carrying the portable locator through the mark displayed on the electronic map; and can obtain security information through the position information; and the guardian can further determine the track of the person under guardianship and carrying the portable locator according to a movement track of the portable locator.

Hence, the technical solutions of embodiments of the present invention can improve the user experience as well as the subsequent missing person-seeking effectiveness.

Figure 5:
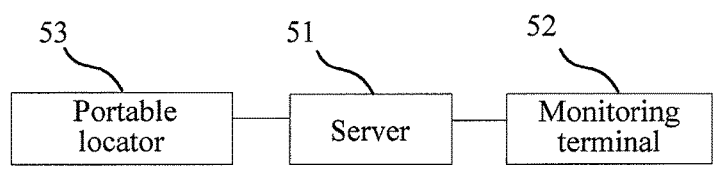
FIG. 5 is a schematic structural diagram of a position information displaying system according to another embodiment of the present invention.

FIG. 5 is a schematic structural diagram of a position information displaying system according to another embodiment of the present invention. As shown in FIG. 5, the system comprises: a server 51, a monitoring terminal 52 and a portable locator 53;

The server 51 comprises the position information displaying device as described in the embodiments shown in FIG. 4; no detailed description will be provided here.

The monitoring terminal 52 is configured to transmit to the server an activation request which comprises an identifier of the portable locator, make the server activates the portable locator corresponding to the identifier of the portable locator, and reports to the portable locator a time interval or a reporting time of reporting the position point information, make the portable locator regularly transmits the position point information of the portable locator to the server according to the time interval or reporting time;

The portable locator 53 is configured to receive the time interval or the reporting time of reporting the position point information transmitted by the server, and regularly transmit the position point information of the portable locator to the server according to the time interval or reporting time; or preset the time interval or the reporting time of reporting the position point information, and regularly transmit the position point information of the portable locator to the server according to the above time interval or reporting time.

Figure 6:
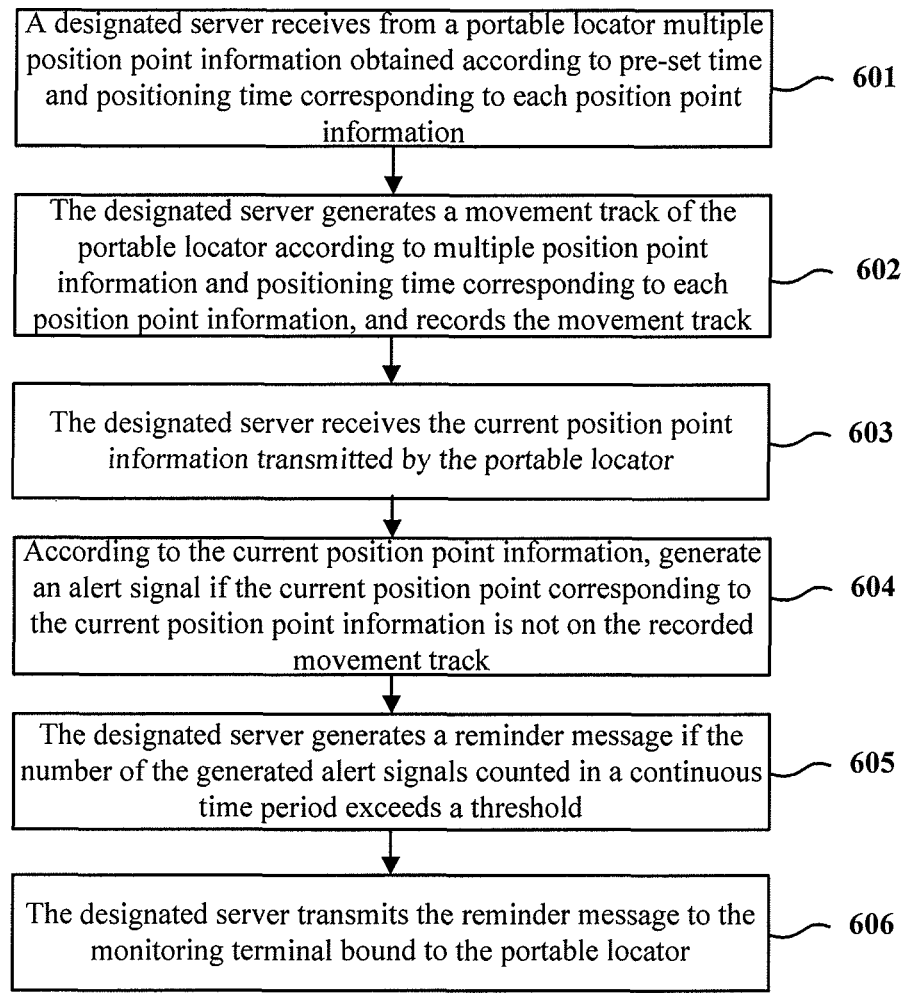
FIG. 6 is a flow chart of a position information prompting method according to an embodiment of the present invention.

FIG. 6 is a flow chart of a position information prompting method according to an embodiment of the present invention. As shown in FIG. 6, the position information prompting method according to the present embodiment may comprise:

601: A designated server receives from a portable locator multiple position point information obtained according to pre-set time and positioning time corresponding to each position point information;

Wherein the position point information comprises information for positioning the position point of the current portable locator in an electronic map;

For example, the preset time in the present embodiment can be a preset time interval or designated time transmitted by the server;

Wherein the designated time transmitted by the server can be determined according to the current position of the portable locator, for example, the positioning time is made longer if the monitored person always stays in a familiar area, or the positioning time become longer if the monitored person walks on a straight road.

Noticeably, prior to step 601, the method comprises:

the designated server receiving an activation request sent by the monitoring terminal, the activation request comprising an identifier of the portable locator; wherein the identifier of the portable locator for example comprises a QR code of the portable locator or a card number of a Subscriber Identity Module (SIM) set in the portable locator;

according to the identifier of the portable locator comprised in the activation request, verifying the monitoring terminal and authorizing the monitoring terminal to have a monitoring right to portable locator;

activating the portable locator corresponding to the identifier of the portable locator, making the activated portable locator transmits position point information of the portable locator to the server.

Further for example, after activating the portable locator corresponding to the identifier of the portable locator, the method further comprises:

the designated server generating a communication whitelist of the portable locator;

adding a communication address of the verified and authorized monitoring terminal to the communication whitelist;

transmitting to the portable locator the communication whitelist to which the communication address of the monitoring terminal is added.

602: the designated server generates a movement track of the portable locator according to multiple position point information and positioning time corresponding to each position point information, and records the movement track;

For example, upon specific implementation, step 602 comprises:

connecting position points corresponding to the position point information in order of the positioning time through roads in the electronic map, generating in the electronic map at least one route from one position point to another position point whose positioning time is adjacent, and rendering all of the generated passable routes as a movement track.

Noticeably, in the present embodiment, the preset time period can be specifically set according to specific situations. For example, if the person under guardianship is a child, the go-to-school time (from 7:00 am to 8:00 am) and after-school time (from 4:00 pm to 5:00 pm) everyday can be a preset time period. In this preset time period, the designated server receives multiple position point information reported by the portable locator, determines, according to each position point information, a natural road where position points corresponding to each position point information lie, marks the position points appearing on the natural road, generates a movement track of the portable locator, and records the movement track.

In practical application, after step 601 and step 602, the recorded movement track can be set as a familiar or safe road.

603: The designated server receives current position point information transmitted by the portable locator;

604: according to the current position point information, generating an alert signal if the current position point corresponding to the current position point information is not on the recorded movement track.

Specifically, when the designated server receives the current position point information transmitted by the portable locator, according to the current position point information, if the current position point corresponding to the current position point information is not on the recorded movement track, this indicates that the monitored person carrying the portable locator is on a strange road.

Further for example, after step 604, the method further comprises:

605: generating a reminder message if the number of the generated alert signals counted by the designated server in a continuous time period exceeds a threshold;

For example, the reminder message is for example a prompt message indicating the monitored person is on a strange road.

606: The designated server transmits the reminder message to the monitoring terminal bound to the portable locator.

In practical application, when the monitored person is monitored by two or more guardians, the monitoring terminal held by each guardian can perform verification and authorization via the sever so that each guardian can learn about the position security information of the monitored person at any time;

Correspondingly, the designated server queries the communication whitelist of the portable locator and obtains the communication address of the monitoring terminal comprised in the communication whitelist of the portable locator;

Send the reminder message to the monitoring terminal corresponding to the obtained communication address of the monitoring terminal, make the monitoring terminal, according to the reminder message, sends an operation instruction to the portable locator via the designated server.

In the embodiment of the present invention, the designated server generates a movement track of the portable locator in the preset time period according to multiple position point information and positioning time corresponding to each position point information, and records the movement track; then, when the designated server receives the current position point information transmitted by the portable locator, according to the current position point information, an alert signal is generated on the basis of the current position point information if the current position point corresponding to the current position point information is not on the recorded movement track. A guardian holding the monitoring terminal can be ensured to know at any time whether the person being monitored and holding the portable locator is on a strange road, and thereby the safety information of the monitored person is master, and user experience and subsequent missing person-seeking effectiveness are enhanced.

Figure 7:
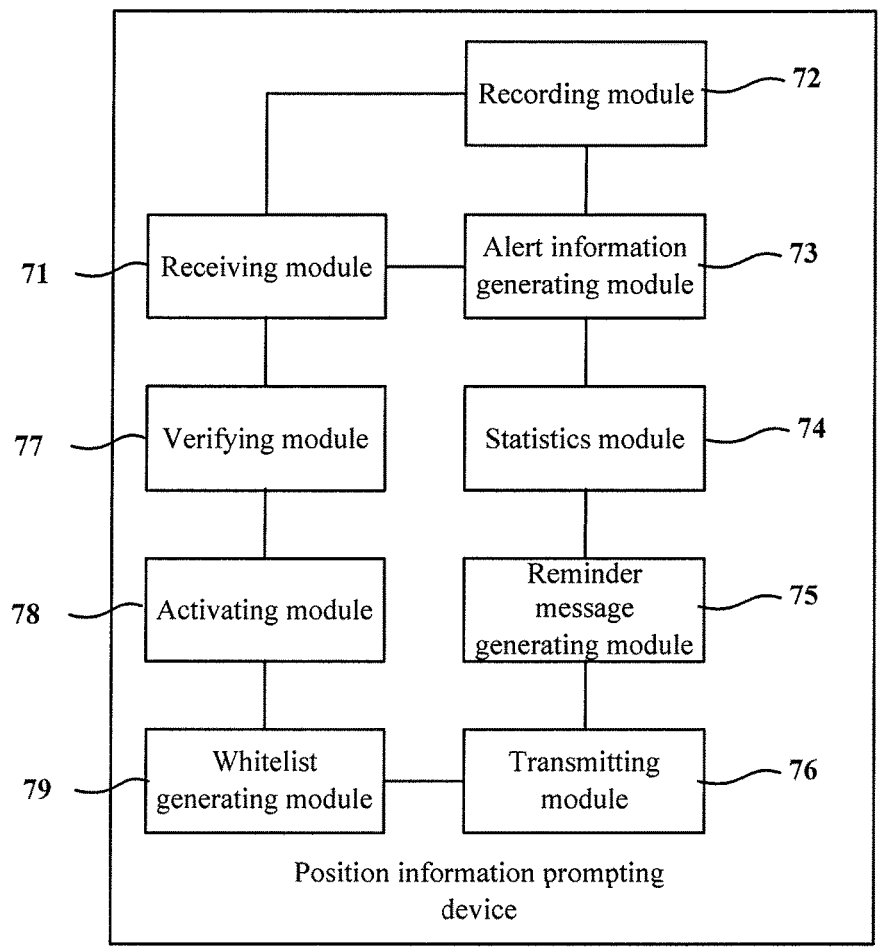
FIG. 7 is a schematic structural diagram of a position information prompting device according to another embodiment of the present invention.

FIG. 7 is a schematic structural diagram of a position information prompting device according to another embodiment of the present invention; on the designated server side, the device specifically comprises as shown in FIG. 7:

a receiving module 71 configured to receive from a portable locator multiple position point information obtained according to pre-set time and positioning time corresponding to each position point information, the position point information comprising information for positioning the position point of the current portable locator in an electronic map;

a recording module 72 configured to generate a movement track of the portable locator according to multiple position point information and positioning time corresponding to each position point information, and records the movement track;

The receiving module 71 is further configured to receive the current position point information transmitted by the portable locator;

An alert information generating module 73 configured to, according to the current position point information, generate an alert signal if the current position point corresponding to the current position point information is not on the movement track recorded by the recording module 72.

Wherein, for example, the preset time can be a preset time interval or designated time transmitted by the server. Wherein the designated time transmitted by the server can be determined according to the current position point of the portable locator.

For example, the recording module is specifically configured to:

connect position points corresponding to the position point information in order of the positioning time through roads in the electronic map, generate in the electronic map at least one route from one position point to another position point whose positioning time is adjacent, and render all of the generated passable routes as a movement track.

Optionally, the device further comprises:

a statistics module 74 configured to count in a continuous time period whether the number of the alert signals generated by the alert information generating module 73 exceeds a threshold;

a reminder message generating module 75 configured to generate a reminder message if the number of the alert signals counted by the statistics module exceeds the threshold;

a transmitting module 76 configured to transmit the reminder message to the monitoring terminal bound to the portable locator.

Optionally, the device further comprises:

The receiving module 71 further configured to receive an activation request sent by the monitoring terminal, the activation request comprising an identifier of the portable locator;

a verifying module 77 configured to, according to the identifier of the portable locator comprised in the activation request, verify the monitoring terminal and authorize the monitoring terminal to have a monitoring right to portable locator;

an activation module 78 configured to activate the portable locator corresponding to the identifier of the portable locator, make the portable locator transmits position point information of the portable locator to the server.

Optionally, the device further comprises:

a whitelist generating module 79 configured to generate a communication whitelist of the portable locator; and add a communication address of the verified and authorized monitoring terminal to the communication whitelist;

the transmitting module 76 further configured to transmit to the portable locator the communication whitelist to which the communication address of the monitoring terminal is added.

Optionally, the transmitting module 76 is specifically configured to:

query the communication whitelist of the portable locator generated by the whitelist generating module 79 and obtain the communication address of the monitoring terminal comprised in the communication whitelist of the portable locator;

send the reminder message to the monitoring terminal corresponding to the obtained communication address of the monitoring terminal, make the monitoring terminal, according to the reminder message, sends an operation instruction to the portable locator via the designated server.

In the embodiment of the present invention, the designated server generates a movement track of the portable locator in the preset time period according to multiple position point information and positioning time corresponding to each position point information, and records the movement track; then, when the designated server receives the current position point information transmitted by the portable locator, according to the current position point information, an alert signal is generated if the current position point corresponding to the current position point information is not on the recorded movement track. A guardian holding the monitoring terminal can be ensured to know at any time whether the person being monitored and holding the portable locator is on a strange road, and thereby the safety information of the monitored person is master, and user experience and subsequent missing person-seeking effectiveness are enhanced.

Figure 8:
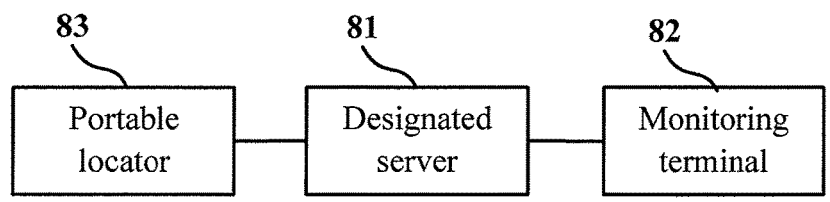
FIG. 8 is a schematic structural diagram of a position information prompting system according to another embodiment of the present invention.

FIG. 8 is a schematic structural diagram of a position information prompting system according to another embodiment of the present invention. As shown in FIG. 8, the system comprises a designated server 81, a monitoring terminal 82 and a portable locator 83;

The portable locator 83 is configured to transmit multiple position point information and positioning time corresponding to each position point information in a preset time period;

The designated server 81 is configured to receive from the portable locator multiple position point information obtained according to pre-set time and positioning time corresponding to each position point information, the position point information comprising information for positioning the position point of the current portable locator in an electronic map, generate a movement track of the portable locator, and record the movement track;

Wherein the preset time for example can be a preset time interval or designated time transmitted by the server. Wherein the designated time transmitted by the server can be determined according to the current position point of the portable locator.

The portable locator 83 is further configured to transmit the current position point information to the designated server;

The designated server 81 is further configured to receive the current position point information transmitted by the portable locator; and according to the current position point information, generate an alert signal if the current position point corresponding to the current position point information is not on the recorded movement track.

Optionally, the designated server 81 is further configured to generate a reminder message when the number of the generated alert signals counted in a continuous time period exceeds a threshold; and transmit the reminder message to the monitoring terminal bound to the portable locator.

The monitoring terminal 82 is configured to send an activation request to the designated server, the activation request comprising an identifier of the portable locator;

The designated server 81 is further configured to receive an activation request sent by the monitoring terminal, and to according to the identifier of the portable locator included in the activation request, verify the monitoring terminal and authorize the monitoring terminal to have a monitoring right to portable locator; and activate the portable locator corresponding to the identifier of the portable locator, make the portable locator transmits position point information of the portable locator to the server.

Optionally, the designated server 81 is further configured to generate a communication whitelist of the portable locator; add a communication address of the verified and authorized monitoring terminal to the communication whitelist; and transmit to the portable locator the communication whitelist to which the communication address of the monitoring terminal is added.

Optionally, the designated server 81 is specifically configured to: query the communication whitelist of the portable locator and obtain the communication address of the monitoring terminal comprised in the communication whitelist of the portable locator; send the reminder message to the monitoring terminal corresponding to the obtained communication address of the monitoring terminal, make the monitoring terminal, according to the reminder message, sends an operation instruction to the portable locator via the designated server.

In the embodiment of the present invention, the designated server generates a movement track of the portable locator in the preset time period according to multiple position point information and positioning time corresponding to each position point information, and records the movement track; then, when the designated server receives the current position point information transmitted by the portable locator, according to the current position point information, an alert signal is generated if the current position point corresponding to the current position point information is not on the recorded movement track. A guardian holding the monitoring terminal can be ensured to know at any time whether the person being monitored and holding the portable locator is on a strange road, and thereby the safety information of the monitored person is master, and user experience and subsequent missing person-seeking effectiveness are enhanced.

Figure 9:
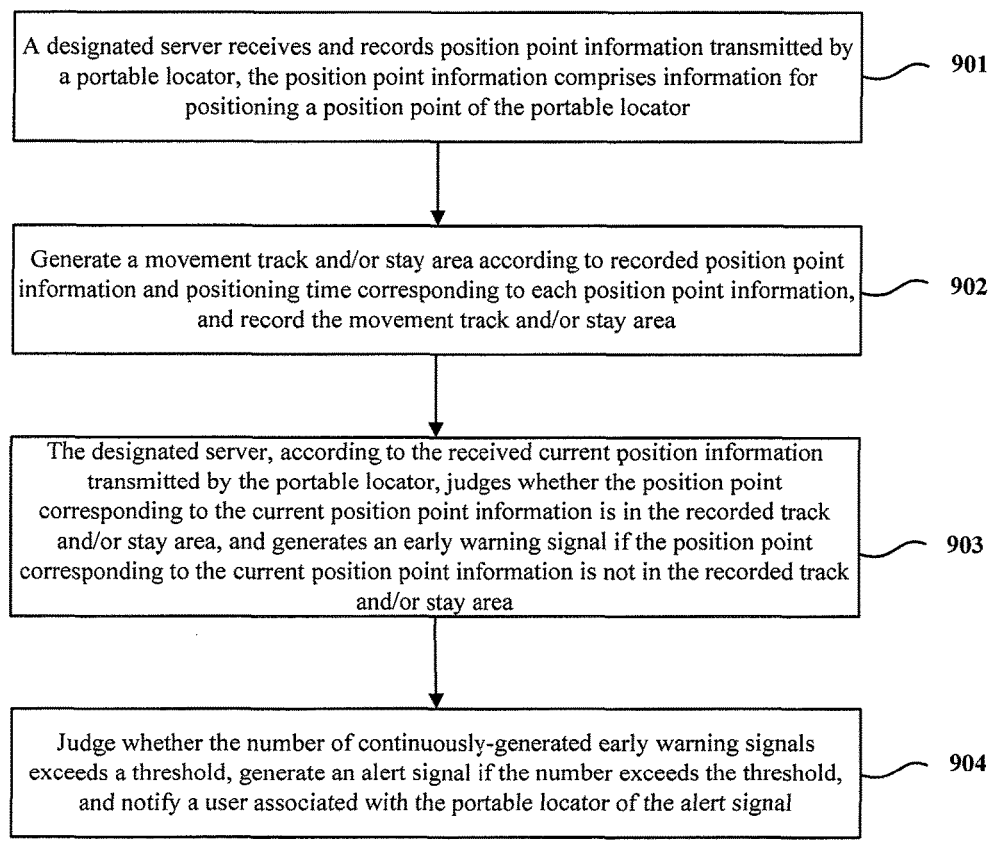
FIG. 9 is a flow chart of a position information prompting method according to an embodiment of the present invention.

FIG. 9 is a flow chart of a position information prompting method according to an embodiment of the present invention. As shown in FIG. 9, the position information prompting method according to the present embodiment may comprise:

901: The designated server receives and records position point information transmitted regularly by the portable locator, wherein the position point information comprises information for positioning a position point of the portable locator;

In an optional embodiment of the present invention, prior to step 901 the method comprises:

The monitoring terminal sends an activation request to the designated server, wherein the activation request comprises an identifier of the portable locator; wherein the identifier of the portable locator for example comprises a QR code of the portable locator or a card number of a Subscriber Identity Module SIM set in the portable locator;

The designated server performs authorization and verification for the monitoring terminal according to the identifier of the portable locator, makes the monitoring terminal can focus on the portable locator, and activates the portable locator corresponding to the identifier, makes the activated portable locator can transmit position point information of the portable locator to the server.

Furthermore, the designated server can create a communication whitelist of the portable locator, and add a communication address of the verified and authorized monitoring terminal to the communication whitelist of the Furthermore, the monitoring terminal can transmit to the activated portable locator via the designated server a time interval or a designated time of reporting the position point information, make the portable locator regularly transmits the position point information of the portable locator to the server according to the time interval or reporting time; or the designated server transmits to the portable locator a time interval o or a designated time f reporting the position point information, make the portable locator regularly transmits the position point information of the portable locator to the designated server according to the time interval or designated time; or the portable locator presets a time interval or a designated time of reporting the position point information, and regularly transmits the position point information of the portable locator to the designated server according to the above time interval or designated time.

For example, upon specific implementation, step 901 comprises:

the designated server, in the preset time period, receives and records position point information positioned and sent by the portable locator at multiple designated time.

902: generating a movement track and/or stay area according to recorded position point information and positioning time corresponding to each position point information, and records the movement track and/or stay area;

In an optional embodiment of the present invention, generating a movement track according to recorded position point information and positioning time corresponding to each position point information comprises:

according to all recorded position point information and positioning time corresponding to each position point information in a designated time period, marking the position point corresponding to each position point information in a temporal order, and generating a movement track of the portable locator.

Wherein the movement track comprises a line formed by connecting, in order of the positioning time, position points corresponding to position point information recorded on the movement track, or comprises an area within a preset scope around the line, a road corresponding to the line in a map and/or an area within a preset scope around the road.

In an optional embodiment of the present invention, generating a stay area according to recorded position point information and positioning time corresponding to each position point information comprises:

generating a location area according to the position point corresponding to the position point information, judging whether the number of occurrences of position points corresponding to other position information occurring again in the location area in a preset time period exceeds a threshold, and marking the location area as a stay area if the number exceeds the threshold.

903: The designated server, according to the received current position information transmitted by the portable locator, judges whether the position point corresponding to the current position point information is in the recorded track and/or stay area, and generates an early warning signal if it the position point is not in the recorded track and/or stay area;

904: judging whether the number of continuously-generated early warning signals exceeds a threshold, and generating an alert signal if the number exceeds the threshold, and notifying a user associated with the portable locator of the alert signal.

For example, in the present embodiment, the associated user comprises a user in the communication whitelist of the portable locator set by the designated server;

Wherein the user comprises a network account logged onto the designated server and authorized to obtain information related to the portable locator, or comprises a monitoring terminal registered in the designated server as bounded with the portable locator.

For example, in the present embodiment, the alert signal comprises prompt information transmitted by short messaging service or Internet, or comprises a special mark corresponding to the position point for generating the early warning signal displayed in the electronic map.

In an optional embodiment of the present invention, if the alert signal comprises the special mark corresponding to the position point for generating the early warning signal displayed in the electronic map;

then judging whether the number of continuously-generated early warning signals exceeds a threshold, and generating an alert signal if the number exceeds the threshold comprises upon specific implementation:

using the position point corresponding to the position point information for generating the early warning signal to generate a location area comprising the position point, and making statistics of whether the number of occurrences of position points corresponding to other recorded position point information in the location area exceeds a threshold, and recording the location area or the position point corresponding to the position point information as a strange reminder area by using a special mark.

In an optional embodiment of the present invention, after recording the location area or the position point corresponding to the position point information as a strange reminder area by using a special mark, the method comprises:

according to the number of position points corresponding to the recorded position point information included in the marked strange reminder area, displaying the marked strange reminder area differently in the electronic map; displaying in the electronic map the marked strange reminder area with different sizes, colors, brightness and transparency.

In an optional embodiment of the present invention, upon specific implementation, the using the position point corresponding to the position point information for generating the early warning signal to generate a location area including the position point comprises:

according to the position point information for generating the early warning signal, considering a natural geographical area where the position point corresponding to the position point information locates as the location area corresponding to the position point information; or according to the position point information for generating the early warning signal, taking the position point corresponding to the position point information as a center, considering a surrounding area of a preset radius as the location area corresponding to the position point information; or according to the position point information for generating the early warning signal, judging there are multiple neighbor position points around the position point corresponding to the position point information, and determining the location area corresponding to the position point information according to a distance between the position point and the multiple neighbor position points.

In an optional embodiment of the present invention, upon specific implementation, the above making statistics of the number of occurrences of position points corresponding to other recorded position point information in the location area comprises:

When specific implemented, making statistics of the number of position points corresponding to the position point information in the location area among recorded position point information in a preset time period as same as a preset time period where a positioning time of the position point information lies;

For example, making statistics of multiple position point information recorded by the server and reported by the locator within a preset time period (one day ore several hours), respectively determining position points corresponding to the multiple position point information, according to each position point, determining which position points fall within the location area determined in step 902, and making statistics of the number of position points falling within the location area determined in step 902; for example, in a certain location area, presetting two hours to make statistics of the number of position points once, specifically, counting from the positioning time of the first position point information, a calculation is performed as to whether the number of position points appearing in the location area within two hours exceeds a threshold, and the position points appearing in the location area after two hours can only participate in the next statistic of the number of position points in the location area.

In the present embodiment, the preset threshold can be specifically set according to different location areas. For example, when the monitored person is a child, school and home, these two location areas, are safe location areas, stay in the two location areas is relatively longer, there are relatively more position point information recorded in the two location areas, so the threshold for the number of position points in the two location areas is relatively larger.

Noticeably, optionally, in the present embodiment, if the designated server for example can determine that the position point corresponding to the position point information on the preset movement track according to the position point information reported by the portable locator, mark the movement track and the position point on the movement track to make the marked position point or movement track distinct from the marked strange reminder area.

In the embodiment of the present invention, the designated server receives and records the position point information transmitted by the portable locator, generates a movement track and/or stay area according to the recorded position point information and positioning time corresponding to each position point information, and records the movement track and/or stay area; when the current position point information transmitted by the portable locator is received, a judgment is performed as to whether the position point corresponding to the current position point information is in the recorded track and/or stay area, and an early warning signal is generated if it the position point is not in the recorded track and/or stay area; another judgment is performed as to whether the number of continuously-generated early warning signals exceeds a threshold, and an alert signal is generated if the number exceeds the threshold, and a user associated with the portable locator is notified of the alert signal. A guardian holding the monitoring terminal can be ensured to know whether the person being monitored and holding the portable locator is in the strange reminder area through the mark displayed in the electronic map, thus the safe position information of the monitored person is master, and user experience and subsequent missing person-seeking effectiveness are enhanced.

Figure 10:
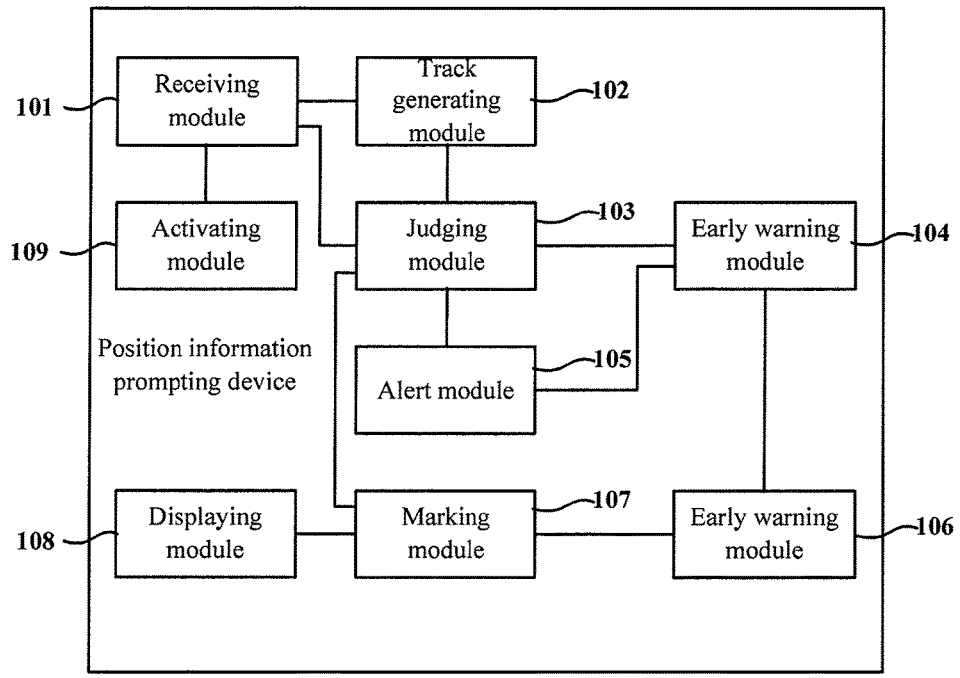
FIG. 10 is a schematic structural diagram of a position information prompting device according to another embodiment of the present invention.

FIG. 10 is a schematic structural diagram of a position information prompting device according to another embodiment of the present invention. On the designated server side, the device specifically comprises as shown in FIG. 10:

a receiving module 101 configured to receive and record multiple position point information transmitted by the portable locator, the position point information comprising information for positioning a position point of the portable locator;

a track generating module 102 configured to generate a movement track and/or stay area according to recorded position point information and positioning time corresponding to each position point information, and record the movement track and/or stay area;

a judging module 103 configured to, when the receiving module 101 receives the current position point information transmitted by the portable locator, judge whether the position point corresponding to the current position point information is in the track and/or stay area recorded by the track generating module 102;

an early warning module 104 configured to generate an early warning signal when the judging module 103 judges the position point corresponding to the current position point information is not in the track and/or stay area recorded by the track generating module 102;

an alert module 105 configured to generate an alert signal when the judging module 103 judges that the number of early warning signals continuously generated by the early warning module 104 exceeds a threshold, and notify a user associated with the portable locator of the alert signal.

Optionally, the receiving module 101 is specifically configured to, the designated server, in a preset time period, receives and records position point information positioned and sent by the portable locator at multiple designated time.

Optionally, the track generating module 102 is specifically configured to generate a movement track according to all recorded position point information and positioning time corresponding to each position point information in a designated time period.

Optionally, the track generating module 102 is specifically configured to generate a location area according to the position point corresponding to the position point information, judge whether the number of occurrences of position points corresponding to other position information occurring again in the location area in a preset time period exceeds a threshold, and mark the location area as a stay area if the number exceeds the threshold.

Optionally, the associated user comprises a user in the communication whitelist of the portable locator set by the designated server;

The user comprises a network account logged onto the designated server and authorized to obtain information related to the portable locator, or comprises a monitoring terminal registered in the designated server as bounded with the portable locator.

Optionally, the alert signal comprises a prompt information transmitted by short messaging service or Internet, or comprises a special mark corresponding to the position point for generating the early warning signal displayed in the electronic map.

Optionally, if the alert signal comprises the special mark corresponding to the position point for generating the early warning signal displayed in the electronic map, the device further comprises:

a statistics module 106 configured to use the position point corresponding to the position point information for generating the early warning signal by the early warning module 104 to generate a location area including the position point, and make statistics of the number of occurrences of position points corresponding to other recorded position point information in the location area;

a marking module 107 specifically configured to record the location area or the position point corresponding to the position point information as a strange reminder area by using a special mark when the judging module 103 judges that the number of occurrences of position points corresponding to other recorded position point information in the location area counted by the statistics module 106 exceeds the threshold.

Optionally, the device further comprises:

a displaying module 108 configured to, according to the number of position points corresponding to the recorded position point information included in the marked strange reminder area, differently display the strange reminder areas marked by marking module the in the electronic map;

the displaying module 108 is specifically configured to display the marked strange reminder areas with different sizes, colors, brightness and transparency.

Optionally, the statistics module 106 is specifically configured to:

make statistics of the number of position points corresponding to the position point information in the location area among position point information recorded in a time period as same as a preset time period where a positioning time of the position point information lies;

wherein the marking corresponds to the preset time period.

Optionally, the location area is as follows:

according to the position point information for generating the early warning signal, considering a natural geographical area where the position point corresponding to the position point information locates as the location area corresponding to the position point information; or according to the position point information for generating the early warning signal, taking the position point corresponding to the position point information as a center, considering a surrounding area of a preset radius as the location area corresponding to the position point information; or according to the position point information for generating the early warning signal, judging there are multiple neighbor position points around the position point corresponding to the position point information, and determining the location area corresponding to the position point information according to a distance between the position point and the multiple neighbor position points.

Optionally, the receiving module 101 is further configured to receive an activation request sent by the monitoring terminal, the activation request comprising an identifier of the portable locator;

The device further comprises:

an activation module 109 configured to, according to the identifier of the portable locator comprised in the activation request, activate the portable locator corresponding to the identifier of the portable locator, make the activated portable locator transmits position point information to the designated server.

For example, the device further comprises:

a transmitting module configured to transmit to the portable locator a time interval or a designated time of reporting the position point information, make the portable locator regularly transmits the position point information of the portable locator to the designated server according to the above time interval or designated time.

Optionally, the track generating module 102 is specifically configured to:

receive multiple position point information transmitted by the portable locator in a continuous time period;

mark the position point corresponding to each position point information in a temporal order according to the positioning time corresponding to each position point information, and generate a movement track of the portable locator.

The movement track comprises a line formed by connecting, in order of the positioning time, position points corresponding to position point information recorded on the movement track, or comprises an area within a preset scope around the line, a road corresponding to the line in a map and/or an area within a preset scope around the road.

Optionally, the marking module 107 is further configured to, according to the position point information, if the position point corresponding to the position information is on the preset movement track, mark the movement track and the position point on the movement track, and make the marked position point or movement track distinct from the strange reminder area.

In the embodiment of the present invention, the designated server receives and records the position point information transmitted by the portable locator, generates a movement track and/or stay area according to the recorded position point information and positioning time corresponding to each position point information, and records the movement track and/or stay area; when the current position point information transmitted by the portable locator is received, a judgment is performed as to whether the position point corresponding to the current position point information is in the recorded track and/or stay area, and an early warning signal is generated if the position point is not in the recorded track and/or stay area; another judgment is performed as to whether the number of continuously-generated early warning signals exceeds a threshold, and an alert signal is generated if the number exceeds the threshold, and a user associated with the portable locator is notified of the alert signal. A guardian holding the monitoring terminal can be ensured to know whether the person being monitored and holding the portable locator is in the strange reminder area through the mark displayed in the electronic map, thus the safe position information of the monitored person is mastered, and user experience and subsequent missing person-seeking effectiveness are enhanced.

Figure 11:
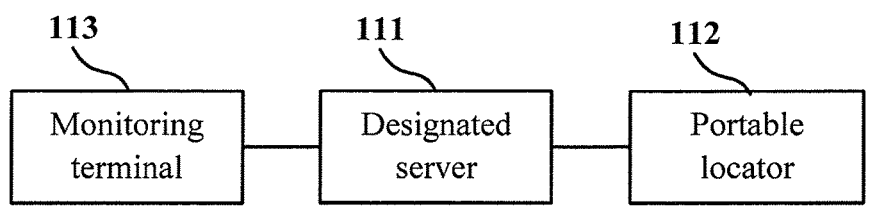
FIG. 11 is a schematic structural diagram of a position information prompting system according to another embodiment of the present invention.

FIG. 11 is a schematic structural diagram of a position information prompting system according to another embodiment of the present invention. As shown in FIG. 11, the system comprises a designated server 111, a portable locator 112 and a monitoring terminal 113;

The designated server 111 comprises the position information prompting device as stated in the embodiment shown in FIG. 10; no detailed depictions will be provided here;

The monitoring terminal 113 is configured to send an activation request to the designated server, the activation request comprising an identifier of the portable locator, make the designated server verifies the monitoring terminal and authorizes the monitoring terminal to have a monitoring right to the portable locator, and activates the portable locator;

The portable locator 112 is configured to transmit position point information of the portable locator to the designated server after activation.

In the embodiment of the present invention, the designated server receives and records the position point information transmitted by the portable locator, generates a movement track and/or stay area according to the recorded position point information and positioning time corresponding to each position point information, and records the movement track and/or stay area; when the current position point information transmitted by the portable locator is received, a judgment is performed as to whether the position point corresponding to the current position point information is in the recorded track and/or stay area, and an early warning signal is generated if it the position point is not in the recorded track and/or stay area; another judgment is performed as to whether the number of continuously-generated early warning signals exceeds a threshold, and an alert signal is generated if the number exceeds the threshold, and a user associated with the portable locator is notified of the alert signal. A guardian holding the monitoring terminal can be ensured to know whether the person being monitored and holding the portable locator is in the strange reminder area through the mark displayed in the electronic map, thus the safe position information of the monitored person is master, and user experience and subsequent missing person-seeking effectiveness are enhanced.

The description as provided here describes a lot of specific details. However, it is appreciated that embodiments of the present invention may be implemented in the absence of these specific details. Some embodiments do not specify detail known methods, structures and technologies to make the description apparent.

Similarly, it should be appreciated that in order to simplify the present disclosure and help understand one or more aspects of the present invention, in the above depictions of exemplary embodiments of the present application, features of the present application are sometimes grouped together to an individual embodiment, figure or depiction thereof. However, the disclosed method should not be interpreted as the following intention: the present application claims more features than the features explicitly recited in each claim. More exactly, as reflected by the following claim set, aspects of the invention are less than all features of an individual embodiment disclosed previously. Therefore, the claim set conforming to a specific implementation mode is thereby explicitly incorporated into this specific implementation mode, wherein each claim itself serves as an individual embodiment of the present application.

Those skilled in the art may appreciate that modules in the apparatus in the embodiment may be changed adaptively and they are set in one or more apparatuses different from the present embodiment. Modules or units or assemblies in the embodiment may be combined into one module or unit or assembly, and besides, they may be divided into a plurality of submodules, subunits or subassemblies. Except that at least some of such features and/or processes or units are mutually repellent, all features disclosed in the specification (including the accompanying claims, abstract and figures) and all processes or units of any method or apparatus disclosed in this way may be combined by employing any combination. Unless otherwise stated expressly, each feature disclosed in the specification (including the accompanying claims, abstract and figures) may be replaced with an alternative feature providing identical, equivalent or similar objective.

In addition, those skilled in the art can understand that even though some embodiments described here include some features other than other features included in other embodiments, combination of features of different embodiments means being within the scope of the present application and forming different embodiments. For example, in the appended claim set, any one of the claimed embodiments may be used in an arbitrary combination manner.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the apparatus according to embodiments of the present invention. The present invention may also be implemented as an apparatus or device program (e.g., computer program and computer program product) for executing part or all of the method described here. Such programs implementing the present invention may be stored in a computer-readable medium, or may be in a form having one or more signals. Such signals can be obtained by downloading from the Internet, or provided on a carrier signal or provided in any other forms.

Figure 12:
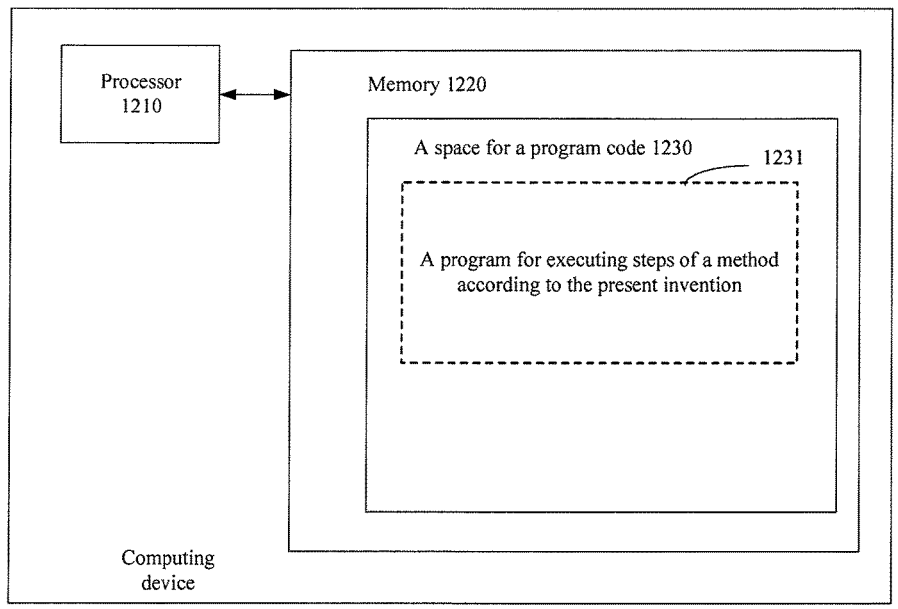
FIG. 12 schematically illustrates a block diagram of a computing device for executing the position information prompting method according to the present invention.
Figure 13:
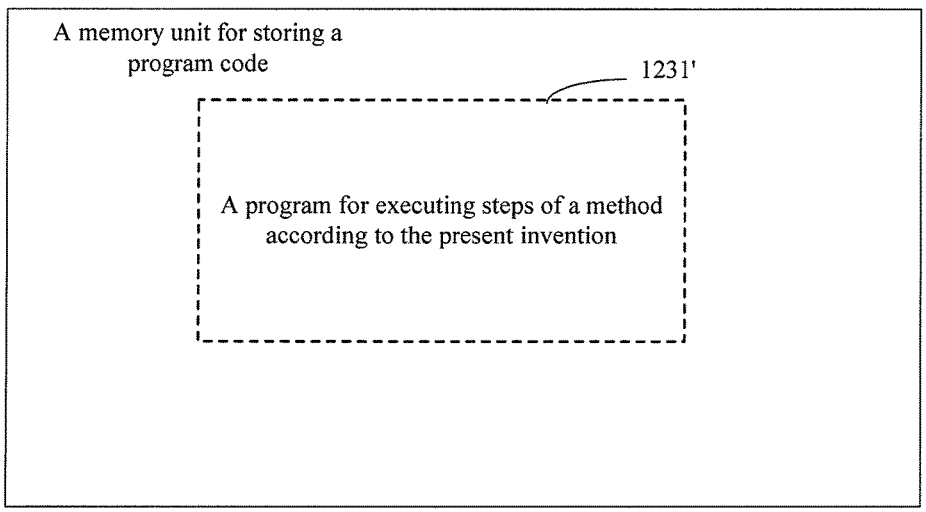
FIG. 13 schematically illustrates a memory unit for maintaining or carrying a program code for implementing the position information prompting method according to the present invention.

For example, FIG. 12 illustrates a computing device for implementing the position information prompting method according to the present invention. The computing device conventionally comprises a processor 1210 and a computer program product or computer-readable medium in the form of a memory 1220. The memory 1220 may be a flash memory, EEPROM (Electrically Erasable Programmable Read-Only Memory), EPROM, hard disk or ROM-like electronic memory. The memory 1220 has a storage space 1230 for a program code 1231 for executing any step of the above method. For example, the storage space 1230 for the program code may comprise program codes 1231 respectively for implementing steps of the above method. These program codes may be read from one or more computer program products or written into the one or more computer program products. These computer program products comprise program code carriers such as hard disk, compact disk (CD), memory card or floppy disk. Such computer program products are usually portable or fixed memory units as shown in FIG. 13. The memory unit may have a storage section, a storage space or the like arranged in a similar way to the memory 1220 in the server of FIG. 12. The program code may for example be compressed in a suitable form. Usually, the memory unit includes a computer-readable code 1231', namely, a code readable by a processor such as 1210. When these codes are run by the computing device, the computing device is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein does not certainly completely refer to the same embodiment.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

The invention claimed is:

1. A position information prompting method, characterized in that the method comprises:
   a designated server receiving from a portable locator multiple position point information obtained according to pre-set time and positioning time corresponding to each position point information, the position point information comprising information for positioning a position point of the portable locator in an electronic map;
   generating a movement track of the portable locator according to multiple position point information and positioning time corresponding to each position point information, and recording the movement track;
   receiving current position point information transmitted by the portable locator; and
   according to the current position point information, generating an alert signal if the position point corresponding to the current position point information is not on the recorded movement track.

2. The method according to claim 1, characterized in that, the generating a movement track of the portable locator according to multiple position point information and positioning time corresponding to each position point information comprises:
   connecting position points corresponding to the position point information in order of the positioning time through roads in the electronic map, generating in the electronic map at least one route from one position point to another position point whose positioning time is adjacent, and rendering all of the generated passable routes as the movement track.

3. The method according to claim 1, characterized in that, after generating the alert signal, the method comprises:
   generating a reminder message if the number of the generated alert signals counted by the designated server in a continuous time period exceeds a threshold;
   transmitting the reminder message to the monitoring terminal bound to the portable locator.

4. The method according to claim 1, characterized in that, the method further comprises:
   the designated server receiving an activation request sent by the monitoring terminal, the activation request comprising an identifier of the portable locator;
   according to the identifier of the portable locator comprised in the activation request, verifying the monitoring terminal and authorizing the monitoring terminal to have a monitoring right to portable locator;
   activating the portable locator corresponding to the identifier of the portable locator, making the portable locator transmits position point information of the portable locator to the designated server.

5. The method according to claim 4, characterized in that, after verifying the monitoring terminal, the method further comprises:
   the designated server generating a communication whitelist of the portable locator;
   adding a communication address of the verified and authorized monitoring terminal to the communication whitelist;
   transmitting to the portable locator the communication whitelist to which the communication address of the monitoring terminal is added.

6. The method according to claim 5, characterized in that, the transmitting the reminder message to the monitoring terminal bound to the portable locator comprises:
   the designated server querying the communication whitelist of the portable locator and obtaining the communication address of the monitoring terminal comprised in the communication whitelist of the portable locator;
   sending the reminder message to the monitoring terminal corresponding to the obtained communication address of the monitoring terminal, making the monitoring terminal, according to the reminder message, sends an operation instruction to the portable locator via the designated server.

7. A position information prompting method, characterized in that the method comprises:
   a designated server receiving and recording position point information transmitted by a portable locator, the position point information comprising information for positioning a position point of the portable locator;
   generating a movement track and/or stay area according to recorded position point information and positioning time corresponding to each position point information, and recording the movement track and/or stay area;
   when receiving the position point information transmitted by the portable locator, the designated server judging whether the position point corresponding to the current position point information is in the recorded track and/or stay area, and generating an early warning signal if the position point corresponding to the current position point information is not in the recorded track and/or stay area;
   judging whether a number of continuously-generated early warning signals exceeds a threshold, generating an alert signal if the number of the continuously-generated early warning signals exceeds the threshold, and notifying a user associated with the portable locator of the alert signal.

8. The method according to claim 7, characterized in that, the designated server receiving and recording position point information transmitted by a portable locator comprises:
   the designated server, in a preset time period, receiving and recording position point information positioned and sent by the portable locator at multiple designated time.

9. The method according to claim 8, characterized in that, the generating a movement track according to recorded position point information and positioning time corresponding to each position point information comprises:
   generating the movement track according to all recorded position point information and positioning time corresponding to each position point information in a designated time period; and/or
   the generating a stay area according to recorded position point information and positioning time corresponding to each position point information comprises:
   generating a location area according to the position point corresponding to the position point information, judging whether the number of occurrences of position points corresponding to other position information occurring again in the location area in a preset time period exceeds a threshold, and marking the location area as a stay area if the number exceeds the threshold.

10. The method according to claim 7, characterized in that, the alert signal comprises a prompt information transmitted by short messaging service or Internet, or comprises a special mark corresponding to the position point for generating the early warning signal displayed in the electronic map;
if the alert signal comprises the special mark corresponding to the position point for generating the early warning signal displayed in the electronic map;
then judging whether the number of continuously-generated early warning signals exceeds a threshold, and generating an alert signal if the number exceeds the threshold comprises:
using the position point corresponding to the position point information for generating the early warning signal to generate a location area comprising the position point, and making statistics of whether the number of occurrences of position points corresponding to other recorded position point information in the location area exceeds a threshold, and
recording the location area or the position point corresponding to the position point information as a strange reminder area by using a special mark;
according to the number of position points corresponding to the recorded position point information included in the marked strange reminder area, displaying the marked strange reminder area differently in the electronic map;
displaying in the electronic map the marked strange reminder area with different sizes, colors, brightness and transparency.

11. The method according to claim 10, characterized in that, the using the position point corresponding to the position point information for generating the early warning signal to generate a location area comprising the position point comprises:
according to the position point information for generating the early warning signal, considering a natural geographical area where the position point corresponding to the position point information locates as the location area corresponding to the position point information; or
according to the position point information for generating the early warning signal, taking the position point corresponding to the position point information as a center, considering a surrounding area of a preset radius as the location area corresponding to the position point information; or
according to the position point information for generating the early warning signal, judging there are multiple neighbor position points around the position point corresponding to the position point information, and determining the location area corresponding to the position point information according to a distance between the position point and the multiple neighbor position points.

12. The method according to claim 10, characterized in that, the making statistics of the number of occurrences of position points corresponding to other recorded position point information in the location area comprises:
making statistics of the number of position points corresponding to the position point information in the location area among recorded position point information in a time period as same as a preset time period where a positioning time of the position point information lies;
the recording the location area or the position point corresponding to the position point information as a strange reminder area comprises:
the marking corresponds to the preset time period.

13. The method according to claim 7, characterized in that, the method further comprises:
the designated server receiving multiple position point information transmitted by the portable locator in a continuous time period;
marking the position point corresponding to each position point information in a temporal order according to the positioning time corresponding to each position point information, and generating a movement track of the portable locator;
the movement track comprises a line formed by connecting, in order of the positioning time, position points corresponding to position point information recorded on the movement track, or comprises an area within a preset scope around the line, a road corresponding to the line in a map and/or an area within a preset scope around the road.

* * * * *